US009000652B2

(12) United States Patent
Kimura et al.

(10) Patent No.: US 9,000,652 B2
(45) Date of Patent: Apr. 7, 2015

(54) THERMIONIC GENERATOR

(75) Inventors: Yuji Kimura, Nagoya (JP); Mitsuhiro Kataoka, Kasugai (JP); Susumu Sobue, Obu (JP)

(73) Assignee: Denso Corporation, Kariya (JP)

( * ) Notice: Subject to any disclaimer, the term of this patent is extended or adjusted under 35 U.S.C. 154(b) by 398 days.

(21) Appl. No.: 13/467,212

(22) Filed: May 9, 2012

(65) Prior Publication Data

US 2012/0299438 A1 Nov. 29, 2012

(30) Foreign Application Priority Data

May 26, 2011 (JP) ................................ 2011-118108

(51) Int. Cl.
*H02N 3/00* (2006.01)
*H01J 45/00* (2006.01)

(52) U.S. Cl.
CPC .................................... *H01J 45/00* (2013.01)

(58) Field of Classification Search
USPC .................. 310/300, 306; 136/200–201, 205, 136/211–212; 322/2 R; 318/117
See application file for complete search history.

(56) References Cited

U.S. PATENT DOCUMENTS 3,169,200 A * 2/1965 Huffman ........................ 310/306
3,400,015 A * 9/1968 Chapman ....................... 310/306
4,280,074 A * 7/1981 Bell .............................. 310/306
4,373,142 A * 2/1983 Morris .......................... 310/306
5,945,767 A * 8/1999 Westlund ....................... 310/306
6,779,347 B2 * 8/2004 Kucherov et al. ................ 62/3.1
6,946,596 B2 * 9/2005 Kucherov et al. ............. 136/205
7,109,408 B2 * 9/2006 Kucherov et al. ............. 136/205
7,352,559 B2 * 4/2008 Sung ............................. 361/502
7,880,079 B2 * 2/2011 Tanielian ....................... 136/205
7,928,630 B2 * 4/2011 Walitzki ......................... 310/306
2003/0184188 A1 10/2003 Kucherov et al.
2011/0017253 A1 * 1/2011 Kataoka et al. ............... 136/205

FOREIGN PATENT DOCUMENTS

EP 0 363 055 A2 9/1989
JP A-2002-540636 11/2002
JP A-2004-349398 12/2004
JP 2007-005589 A 1/2007
JP 2008-228478 A 9/2008
JP A-2008-228387 9/2008
WO WO 00/59047 10/2000

OTHER PUBLICATIONS

Office Action mailed Mar. 19, 2013 in corresponding JP Application No. 2011-118108 (and English translation).
Office Action mailed Jul. 22, 2014 in the corresponding JP application No. 2013-090439, which is a divisional application of JP No. 2011-118108 (with English translation).

* cited by examiner

*Primary Examiner* — Burton Mullins
(74) *Attorney, Agent, or Firm* — Posz Law Group, PLC

(57) ABSTRACT

A thermionic generator for converting thermal energy to electric energy includes: an emitter electrode for emitting thermal electrons from a thermal electron emitting surface when heat is applied to the emitter electrode; a collector electrode facing the emitter electrode spaced apart from the emitter electrode by a predetermined distance, and receiving the thermal electrons from the emitter electrode via a facing surface of the collector electrode; and a substrate having one surface. The emitter electrode and the collector electrode are disposed on the one surface of the substrate, and are electrically insulated from each other. The thermal electron emitting surface and the facing surface are perpendicular to the one surface.

7 Claims, 5 Drawing Sheets

THERMIONIC GENERATOR

CROSS REFERENCE TO RELATED APPLICATION

This application is based on Japanese Patent Application No. 2011-118108 filed on May 26, 2011, the disclosure of which is incorporated herein by reference.

TECHNICAL FIELD

The present disclosure relates to a thermionic generator for converting thermal energy to electric energy.

BACKGROUND

Conventionally, JP-A-2004-349398 teaches a thermionic generator for converting thermal energy to electric energy according to phenomena that thermal electron is emitted from a surface of an electrode at high temperature. in order to increase efficiency of generating electricity in the thermionic generator, it is considered that a distance between electrodes is shortened to be a few nano meters so that a tunnel effect occurs.

However, it is difficult to keep the distance between the electrodes to be extremely narrow. When the thermionic generator is manufactured by a mechanical processing method, the above distance may exceed a limit of processing accuracy. Accordingly, US 2003/0184188 and JP-A-2002-540636 teach a method for keeping a distance between electrodes with using a point contact insulator arranged between the electrodes. U.S. Pat. No. 4,373,142 and JP-A-2008-228387 teaches a method for forming a surface of an electrode to be a comb-tooth shape and for forming an insulation layer at a top of the comb-tooth shape.

Further, JP-A-2004-349398 also teaches a method for reducing thermal loss such that a narrow distance between electrodes is uniformly formed by a semiconductor processing technique, and the shortest distance between the electrodes via an insulation spacer is made longer than a distance between the electrodes without the spacer. When the distance between the electrodes is kept by the spacer, the distance can be made extremely narrow since the electrodes are manufactured by the semiconductor processing method, which provides micro fabrication. Further, it is suitable to control the distance stably and to improve reliability. Furthermore, the generator is manufactured at low cost.

However, when the distance between the electrodes is maintained with using the spacers, a surface area of a whole of the spacers increases according to the number of spacers. In this case, a surface resistance of the spacers is reduced, so that current may leak on the surface of the spacers.

Further, it is necessary to reduce an area of each electrode in order to lengthen the shortest distance between the electrodes via the insulation spacer to be longer than the distance between the electrodes without the spacer when the distance between the insulation spacer and the electrode is secured.

Accordingly, the area of the electrode is reduced per unit area of the device, so that the output of the thermionic generator per unit area is lowered.

SUMMARY

It is an object of the present disclosure to provide a thermionic generator having sufficient output per unit area, and current leakage between electrodes of the generator is improved.

According to a first aspect of the present disclosure, a thermionic generator for converting thermal energy to electric energy with using thermal electrons displaced between a pair of an emitter electrode and a collector electrode, the thermionic generator includes: the emitter electrode for emitting the thermal electrons from a thermal electron emitting surface of the emitter electrode when heat from an external heat source is applied to the emitter electrode; the collector electrode facing the emitter electrode and spaced apart from the emitter electrode by a predetermined distance, wherein the collector electrode receives the thermal electrons from the emitter electrode via a facing surface of the collector electrode, which faces the thermal electron emitting surface; and a substrate having one surface. The emitter electrode and the collector electrode are disposed on the one surface of the substrate. The emitter electrode is electrically insulated from the collector electrode. The thermal electron emitting surface and the facing surface are perpendicular to the one surface.

In the above generator, a gap between the emitter electrode and the collector electrode is formed without using a spacer. Thus, a leak current does not flow through the spacer. Further, even if the leak current occurs, the leak current flows only on a part of the one surface of the substrate, which is disposed between the emitter electrode and the collector electrode. Accordingly, the leak current between the emitter electrode and the collector electrode is reduced. Further, since the emitter and collector electrodes stand on the substrate perpendicularly, the area of each of the thermal electron emitting surface and the facing surface is made wider than a part of the one surface of the substrate, which occupies the emitter and collector electrodes. Thus, the output power of the generator per unit area of the one surface of the substrate is improved.

According to a second aspect of the present disclosure, a thermionic generator for converting thermal energy to electric energy with using thermal electrons displaced between a pair of an emitter electrode and a collector electrode, the thermionic generator includes: the emitter electrode for emitting the thermal electrons from a thermal electron emitting surface of the emitter electrode when heat from an external heat source is applied to the emitter electrode; the collector electrode receiving the thermal electrons from the emitter electrode via a facing surface of the collector electrode; an insulation layer sandwiched between the emitter electrode and the collector electrode; a substrate having one surface; and a pair of stacked structures, each of which includes the emitter electrode, the insulation layer and the collector electrode stacked on the one surface of the substrate. The thermal electron emitting surface of the emitter electrode and the facing surface of the collector electrode in each stacked structure are disposed on a same plane. The same plane of one stacked structure faces the same plane of the other stacked structure. The same plane of one stacked structure and the same plane of the other stacked structure are perpendicular to the one surface of the substrate.

In the above generator, one stacked structure and the other stacked structure are arranged on the substrate, and are separated from each other by a gap without using a spacer. Thus, a leak current does not flow through the spacer. Accordingly, the leak current between the emitter electrode and the collector electrode is reduced. Further, since the stacked structures stand on the substrate, the area of each of the thermal electron emitting surface and the facing surface is made wider than a part of the one surface of the substrate, which occupies the stacked structure. Thus, the output power of the generator per unit area of the one surface of the substrate is improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with reference to drawings. In each embodiment, when an element in one embodiment is the same as or equivalent to an element in another embodiment, the element has the same reference number.

(First Embodiment)

A first embodiment of the present disclosure will be explained with reference to the drawings. A thermionic generator converts thermal energy to electric energy with using thermal electrons, which moves between a pair of electrodes arranged to face each other.

Figure 1:
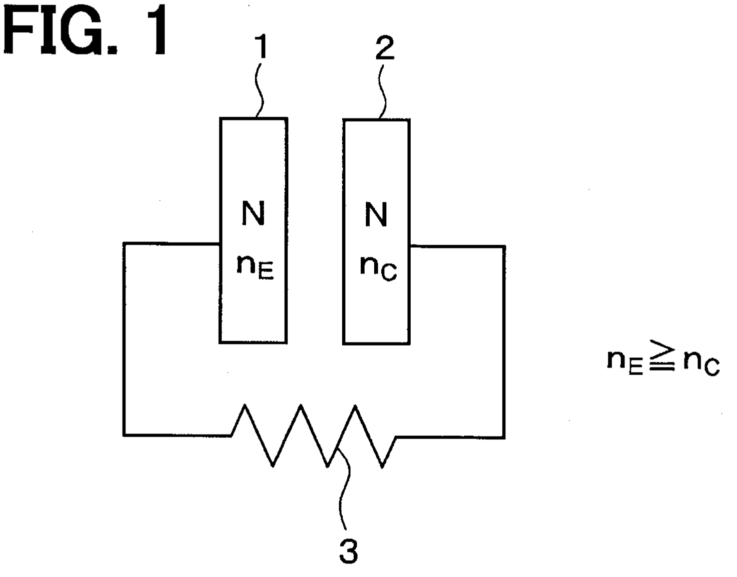
FIG. 1 is a schematic diagram showing a thermionic generator according to a first embodiment.

FIG. 1 is a schematic diagram of the thermionic generator. As shown in FIG. 1, the generator includes a pair of electrodes, which includes an emitter electrode 1 and a collector electrode 2. The emitter electrode 1 and the collector electrode 2 face each other. With using thermal electrons moving between the emitter electrode 1 and the collector electrode 2, the generator supplies electricity to a load 3, which is connected between the electrodes 1, 2.

The emitter electrode 1 is made of diamond semiconductor having a N conductive type with a high dopant concentration. The collector electrode 2 is made of diamond semiconductor having the N conductive type with a low dopant concentration. When the emitter electrode 1 is heated, the thermal electrons from the emitter electrode 1 provide current defined by Je. The current Je is calculated by the following equation F1.

$$Je=An_eT^2\exp(-e\phi_E/kT) \qquad \text{F1}$$

When the electrodes 1, 2 are made of semiconductor, the thermal electron emission from the electrode depends on the temperature of the electrode and the dopant concentration in the electrode. Accordingly, when the emitter electrode 1 is made of highly doped semiconductor, and the collector electrode 2 is made of low doped semiconductor, the emission of the thermal electros from the collector electrode 2 is reduced, so that the power generation efficiency is improved.

In the equation F1, A represents a Richardson constant. $n_e$ represents a dopant concentration in the emitter electrode 1. T represents the temperature of the electrodes 1,2. e represents an elementary electric charge. k represents a Boltzmann coefficient. $\phi_E$ represents a work function of semiconductor material in the emitter electrode 1, i.e., a work function of diamond semiconductor.

In a conventional thermionic generator, the generator does not generate electricity when the temperature of the collector electrode 2 is not lower than the temperature of the emitter electrode 1. Further, in the conventional generator, when the temperature difference between the collector electrode 2 and the emitter electrode 1 is small, the power generation efficiency is low. Since the emitter electrode 1 is made of highly doped semiconductor, and the collector electrode 2 is made of low concentration diamond semiconductor, even when there is no temperature difference between the collector electrode 2 and the emitter electrode 1, the generator generates the electricity. Thus, it is not necessary to cool the collector electrode 2.

When the temperature of the emitter electrode 1 is equal to the temperature of the collector electrode 2, one of the electrodes 1, 2 having a smaller work function that the other provides many thermal electrons, which are excited. However, it is necessary to exceed an energy threshold of the difference of the work function in order to reach the thermal electrons from the one electrode having the small work function to the other electrode having the large work function. Accordingly, since the number of the excited electrons transmitted from the emitter electrode 1 to the collector electrode 2 is equal to the number of the excited electrons transmitted from the collector electrode 2 to the emitter electrode 1, the thermionic generator does not generate electricity.

In view of the above points, the emitter electrode 1 is made of highly doped semiconductor, and the collector electrode 2 is made of low doped semiconductor. Since the dope concentration in the collector electrode 2 is lower than the emitter electrode 1, the amount of thermal electrons transmitted from the collector electrode 2 to the emitter electrode 1 is made smaller. Accordingly, even when the temperature of the collector electrode 2 is equal to the emitter electrode 1, the thermionic generator generates electricity. Thus, when the doping concentration of the emitter electrode 1 is higher than the doping concentration of the collector electrode 2, a same effect of a case where the temperature of the collector electrode 2 is lower than the temperature of the emitter electrode 1 is obtained. Even when the temperature of the collector electrode 2 is lower than the temperature of the emitter electrode 1, a back emission of the collector electrode 2 is restricted. Thus, the generating efficiency of the generator is improved.

Figure 2A:
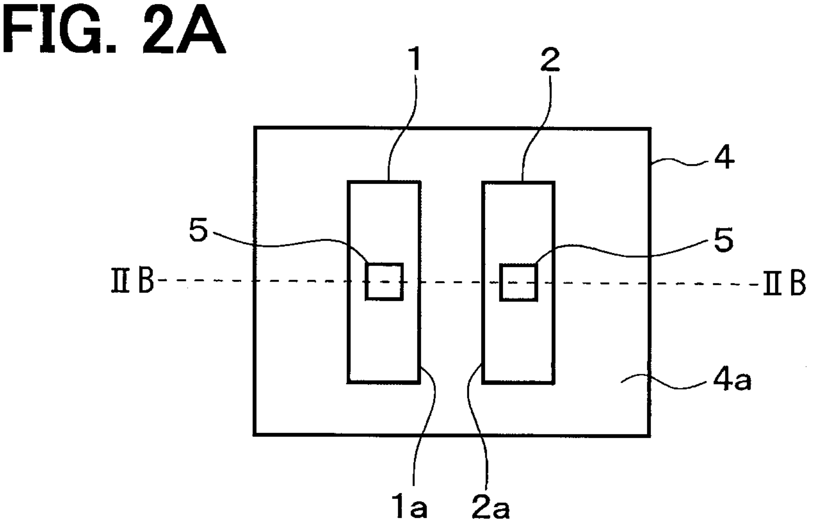
FIG. 2A is a diagram showing a plan view of the generator in FIG. 1.

Next, the construction of the thermionic generator will be explained with reference to FIGS. 2A and 2B. FIG. 2A shows the thermionic generator, and FIG. 2B shows a cross sectional view of the generator.

Figure 2B:
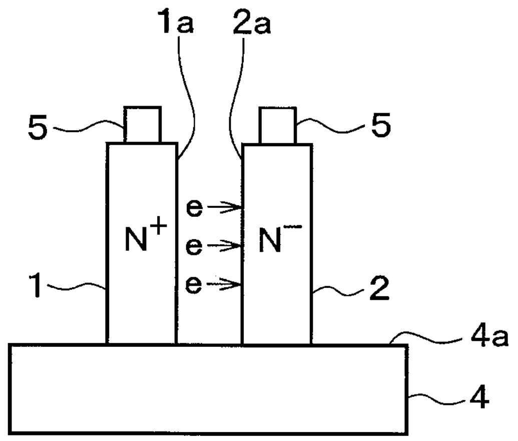
FIG. 2B is a diagram showing a cross sectional view of the generator taken along line IIB-IIB in FIG. 2A.

As shown in FIGS. 2A and 2B, the generator includes an insulation substrate 4, an emitter electrode 1 and a collector electrode 2 disposed on the substrate 4, and emitter side and collector side electrode elements 5. This generator is accommodated in a vacuum chamber.

The insulation substrate 4 is a single board made of $SiO_2$ or glass. The substrate 4 has a front surface 4*a*.

The emitter electrode 1 has a thermal electron emitting surface 1*a* so that the thermal electrons are emitted from the surface 1*a* when heat from a thermal source is applied to the electrode 1. The collector electrode 2 faces the emitter electrode 1, and is spaced apart from the emitter electrode 1 by a predetermined distance. The collector electrode 2 has a facing surface 2*a* so that the thermal electrons emitted from the emitter electrode 1 are received by the surface 2*a*. The distance between the thermal electron emitting surface 1*a* and the facing surface 2*a* is, for example, 50 micrometers or less. The distance between the thermal electron emitting surface 1*a* and the facing surface 2*a* may be equal to or smaller than 10 micrometers.

The height of the emitter electrode 1 and the height of the collector electrode 2 from the front surface 4*a* of the substrate 4 are, for example, 100 micrometers. The thickness of the emitter electrode 1 and the thickness of the collector electrode 2, i.e., the width of the emitter electrode 1 and the thickness of the collector electrode 2 in one direction in parallel to the front surface 4*a*, are 10 micrometers, for example. As shown in FIG. 2A, each of the emitter electrode 1 and the collector electrode 2 is arranged in parallel to each other, and has a plate shape.

Here, the thickness of the emitter electrode 1 is the width of the emitter electrode 1 in the one direction on the front surface 4*a* of the substrate 4. The thickness of the emitter electrode 1 is also defined as the thickness of the emitter electrode 1 in a direction perpendicular to the thermal electron emitting surface 1*a*. Similarly, the thickness of the collector electrode 2 is the width of the collector electrode 2 in the one direction on the front surface 4*a* of the substrate 4. The thickness of the collector electrode 2 is also defined as the thickness of the collector electrode 2 in a direction perpendicular to the facing surface 2*a*.

The distance between the thermal electron emitting surface 1*a* and the facing surface 2*a* may be narrower than the thickness of the emitter electrode 1 and the thickness of the collector electrode 2. Thus, an integration degree of the generator is improved, and therefore, the system generates the electricity with high efficiency.

Assuming that the front surface 4*a* of the substrate 4 has an area of 30 micrometers square, the thermionic generator is arranged on the substrate 4. Conventionally, each electrode 1, 2 is stacked on the front surface 4*a* so that the generator has a lateral structure. Accordingly, in a conventional generator, the facing area of the electrodes 1, 2 is equal to or smaller than the area of 30 micrometers square. However, in the present embodiment, each electrode 1, 2 stands on the front surface 4*a* so that the generator has a vertical structure. Accordingly, although the substrate area, on which the generator is formed, in the present generator according to the present embodiment is equal to that in the conventional generator, the facing area of each electrode 1, 2 is made wider when the height of each electrode 1, 2 is made higher. Thus, the facing area of each electrode 1, 2 per unit area of the front surface 4*a* of the substrate 4 is made wider than the conventional lateral structure. The output power of the generator is sufficient, and the generator generates the electricity larger than the conventional generator.

The thermal electron emitting surface 1*a* of the emitter electrode 1 faces the facing surface 2*a* of the collector electrode 2. Thus, the thermal electrons emitted from the thermal electron emitting surface 1*a* of the emitter electrode 1 are displaced to the collector electrode 2 through the facing surface 2*a*.

Further, as described above, each of the emitter electrode 1 and the collector electrode 2 is made of semiconductor material with the semiconductor impurities doped in the semiconductor material. The semiconductor material may be diamond. The dopant concentration of the semiconductor impurities doped in the semiconductor material for providing the emitter electrode 1 is higher than that in the semiconductor material for providing the collector electrode 2.

For example, the dopant concentration of the emitter electrode 1 is, for example, $1\times10^{20}$ atoms/cm$^3$. The dopant concentration of the collector electrode 2 is, for example, $1\times10^{19}$ atoms/cm$^3$. Thus, the dopant concentration of the emitter electrode 1 is ten times larger than the dopant concentration of the collector electrode 2. In order to increase the amount of the excided thermal electrons and to improve the power generation efficiency, the dopant concentration of the emitter electrode 1 may be equal to or larger than $1\times10^{19}$ atoms/cm$^3$. The semiconductor impurities doped in the semiconductor material may be nitrogen (i.e., N), phosphorous (i.e., P), arsenic (i.e., As), antimony (i.e., Sb), sulfur (i.e., S) or the like.

The conductive types of the emitter electrode 1 and the collector electrode 2 are a combination of a N conductive type and a N conductive type, a combination of a P conductive type and a P conductive type, a combination of a N conductive type and a P conductive type, or a combination of a P conductive type and a N conductive type according to the semiconductor impurities doped in the semiconductor material. When the conductive types of the emitter electrode 1 and the collector electrode 2 are a combination of a P conductive type and a P conductive type, a combination of a N conductive type and a P conductive type, or a combination of a P conductive type and a N conductive type, it is necessary to heat the emitter electrode 1 and the collector electrode 2 at high temperature. Accordingly, the conductive types of the emitter electrode 1 and the collector electrode 2 may be a combination of a N conductive type and a N conductive type.

The emitter electrode 1 and the collector electrode 2 are arranged on the front surface 4*a* of the same substrate 4 such that each of the thermal electron emitting surface 1*a* and the facing surface 2*a* is perpendicular to the front surface 4*a*. Here, each of the emitter electrode 1 and the collector electrode 2 contacts the substrate 4, and the emitter electrode 1 and the collector electrode 2 are electrically isolated for each other by the insulation substrate 4.

The electrode elements 5 are made of metal having a high melting point such as tungsten (i.e., W), titanium (i.e., Ti) or molybdenum (i.e., Mo). Each of the electrode elements 5 is disposed on the emitter electrode 1 and the collector electrode 2, respectively.

Thus, the thermionic generator has the above structure. A method for manufacturing the generator will be explained with reference to FIGS. 3A to 3D. FIGS. 3A to 3D shows a cross sectional view.

Figure 3A:
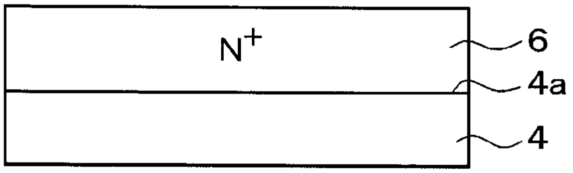
FIGS. 3A to 3D are diagrams showing a manufacturing process of the generator in FIG. 2A.

First, in step in FIG. 3A, the insulation substrate 4 made of $SiO_2$ is prepared. A diamond semiconductor film 6 having the N+ conductive type is formed on the front surface 4*a* of the substrate 4. The forming method of the diamond semiconductor film 6 may be a CVD method such as a microwave plasma CVD method, a RF plasma CVD method and a DC plasma CVD method or a sputtering method such as a RF plasma sputtering method and a DC plasma sputtering method. The diamond semiconductor film 6 may be made of single crystal or poly crystal.

Figure 3B:
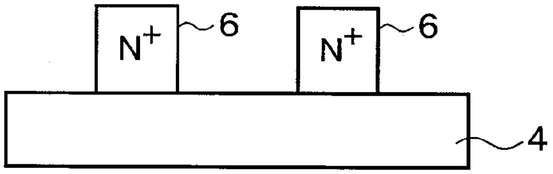

In step in FIG. 3B, the diamond semiconductor film 6 is processed to have a predetermined pattern. In the present embodiment, the emitter electrode 1 has a plan layout of a stripe shape, as shown in FIG. 2A. The diamond semiconductor film 6 is patterned to have the stripe plan layout. The patterning method of the film 6 may be a dry etching method so that the film 6 is processed perpendicularly.

Figure 3C:
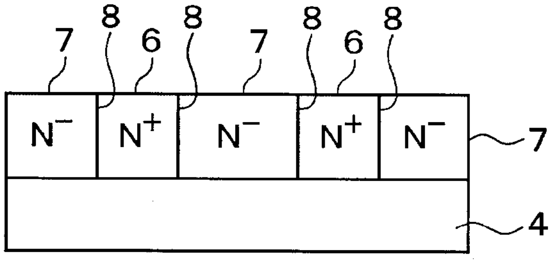

In step in FIG. 3C, a N− conductive type diamond semiconductor film 7 is formed over a part of the front surface 4*a*, the film 6 on which is removed. The forming method of the film 7 is similar to the film 6. After the film 7 is deposited, the surface of the film 7 is mechanically or chemically flattened.

Alternatively, the film 7 may be selectively formed only on the front surface 4*a* of the substrate 4, so that the film 7 is not deposited on the film 6. In this case, it is not necessary to flatten the surface of the film 7.

Figure 3D:
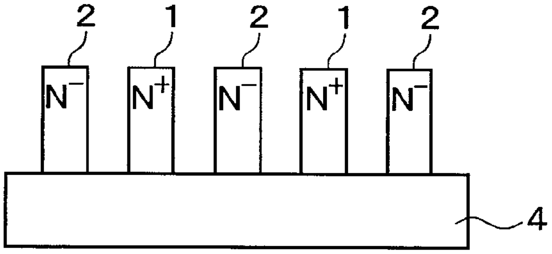

In step in FIG. 3D, the films 6, 7 are processed by a dry etching method such as a trench etching method so that the emitter electrode 1 and the collector electrode 2 are separated by a predetermined distance. In this case, when the trench etching process is performed to etch the films 6, 7 including the boundary between the film 6 and the film 7, the N+ conductive type diamond semiconductor film 6 and the N− conductive type diamond semiconductor film 7 are alternatively arranged. After the trench etching process, the film 6 provides the emitter electrode 1, and the film 7 provides the collector electrode 2. The dry etching process as a semiconductor process provides a structure such that a depth of a groove is about 100 micrometers, and a width of the groove is about 1 micrometer. Thus, the dry etching method is suitable for integration of the generator.

Then, the emitter side and collector side electrode elements 5 are formed on the emitter electrode 1 and the collector electrode 2, respectively. Thus, the thermionic generator is completed. In FIG. 2, a pair of the emitter electrode 1 and the collector electrode 2 is shown. Multiple pairs of the emitter electrodes 1 and the collector electrodes 2 may be formed on the substrate 4. In this case, the emitter electrodes 1 and the collector electrodes 2 are connected in series with each other. The emitter electrode 1 and the collector electrode 2 are sealed in vacuum. Thus, the thermionic generator is completed.

Next, the functions of the thermionic generator will be explained. As described above, the thermionic generator converts the thermal energy to the electric energy with utilizing a phenomenon such that the thermal electrons are emitted from the surface of the electrode. Specifically, when the heat from the external heat source is applied to the emitter electrode 1, the thermal electrons are excited from a Fermi level to a conduction band of the diamond semiconductor material in the emitter electrode 1. Since the conduction band in the diamond semiconductor material has a negative affinity, the conduction band of the diamond semiconductor material is higher than a vacuum level. Accordingly, the thermal electrons excited on the conduction band are emitted to vacuum without an energy boundary. Specifically, the generating efficiency of the generator when the diamond material is used is higher than a case where a metallic material is used for the generator.

Space between the emitter electrode 1 and the collector electrode 2 is in vacuum. Further, since the distance between the emitter electrode 1 and the collector electrode 2 is short, the thermal electrons can be displaced from the thermal electron emitting surface 1*a* of the emitter electrode 1 to the facing surface 2*a* of the collector electrode 2. The thermal electrons displaced to the collector electrode 2 is returned to the emitter electrode 1 via the load 3. Thus, the thermionic generator supplies electricity to the load 3.

Each of the emitter electrode 1 and the collector electrode 2 is not in vacuum alone, but the emitter electrode 1 and the collector electrode 2 are supported on the front surface 4*a* of the substrate 4 in vacuum. Accordingly, current may leak from the emitter electrode 1 to the collector electrode 2 via the front surface 4*a*. Here, in a conventional generator, a spacer is arranged between the emitter electrode 1 and the collector electrode 2, and therefore, the surface of the spacer may provide a leak current path. Specifically, in the conventional generator, multiple spacers are arranged between the emitter electrode 1 and the collector electrode 2 since it is difficult to maintain the distance between the emitter electrode 1 and the collector electrode 2 with using only one spacer. Accordingly, the area of the leak current path is in proportion to the number of spacers.

However, in the present embodiment, without the spacer, the gap between the thermal electron emitting surface 1*a* and the facing surface 2*a* is maintained by the single insulation substrate 4. Thus, the current does not leak via the spacer. Even if the leak current flows between the emitter electrode 1 and the collector electrode 2, the leak current merely flows on a part of the front surface 4*a* between the emitter electrode 1 and the collector electrode 2. Accordingly, even if the leak current flows, the leak current between the emitter electrode 1 and the collector electrode 2 is limited.

Thus, in the present embodiment, the emitter electrode 1 and the collector electrode 2 are arranged on the same substrate 4 such that the thermal electron emitting surface 1*a* and the facing surface 2*a* are perpendicular to the front surface 4*a*.

Thus, since the emitter electrode 1 and the collector electrode 2 are arranged to face each other without the spacer, the current leakage via the spacer is prevented. Further, even if the current leaks, the leak current merely flows on the part of the front surface 4*a* between the emitter electrode 1 and the collector electrode 2. Accordingly, the leak current between the emitter electrode 1 and the collector electrode 2 is restricted.

Since the emitter electrode 1 and the collector electrode 2 stand on the substrate such that the thermal electron emitting surface 1*a* and the facing surface 2*a* are perpendicular to the front surface 4*a*, the output electricity of the thermionic generator is sufficiently secured without increasing the area of the front surface 4*a* of the substrate, which the generator occupies. Since the ration as an aspect ratio between the electrode distance and the electrode height can be made higher, the output electricity of the generator becomes larger. Here, the electrode distance is a distance between the electrodes 1, 2, and the electrode height is a height of each electrode 1, 2.

The insulation substrate 4 may be an insulator.

(Second Embodiment)

Figure 4:
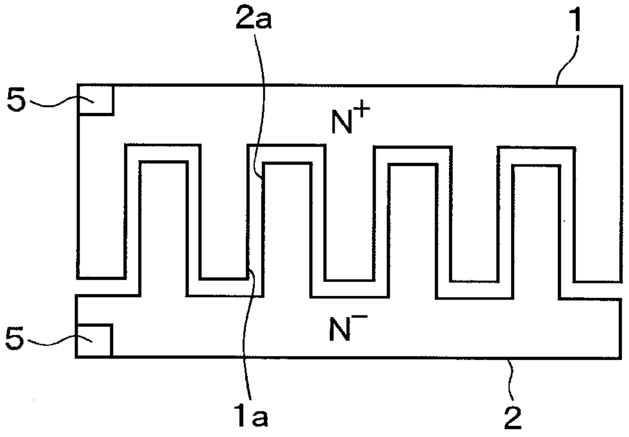
FIG. 4 is a diagram showing a plan layout of a thermionic generator according to a second embodiment.

FIG. 4 shows a thermionic generator according to a second embodiment. As shown in FIG. 4, the emitter electrode 1 and the collector electrode 2 have a comb-teeth shape. One of comb-teeth of the emitter electrode 1 is arranged between adjacent comb-teeth of the collector electrode 2. One of comb-teeth of the collector electrode 2 is arranged between adjacent comb-teeth of the emitter electrode 1.

In the above layout of the emitter electrode 1 and the collector electrode 2, a whole surface of a comb-tooth of the emitter electrode 1, which faces the collector electrode 2, provides the thermal electron emitting surface 1*a*. Further, a whole surface of a comb-tooth of the collector electrode 2, which faces the emitter electrode 1, provides the facing surface 2*a*. Compared with a case where the emitter electrode 1 and the collector electrode 2 does not have the comb-teeth shape, the area of the thermal electron emitting surface 1*a* of one comb-tooth of the emitter electrode 1 is increased, and the area of the facing surface 2*a* of one comb-tooth of the collector electrode 2 is increased.

Further, only one pair of electrode elements 5 for connecting to the load 3 is formed on the emitter electrode 1 and the collector electrode 2, respectively. Accordingly, compared with a case where it is necessary to form multiple pairs of electrode elements 5 on the emitter electrode 1 and the collector electrode 2 so that the emitter electrode 1 and the collector electrode 2 are connected to the load 3, the electric connection structure of the generator is simplified.

(Third Embodiment)

Figure 5A:
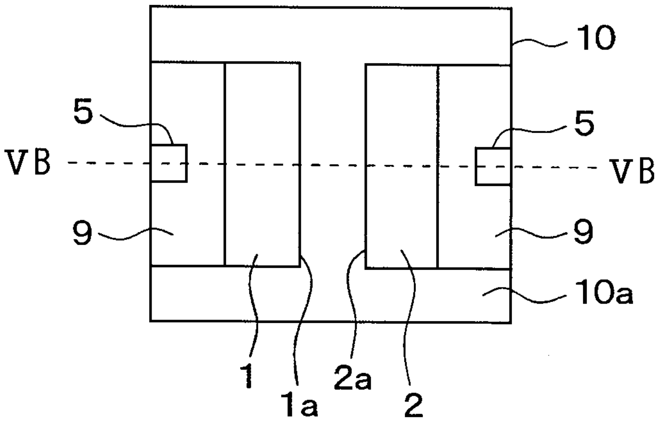
FIG. 5A is a diagram showing a plan view of a thermionic generator according to a third embodiment.
Figure 5B:
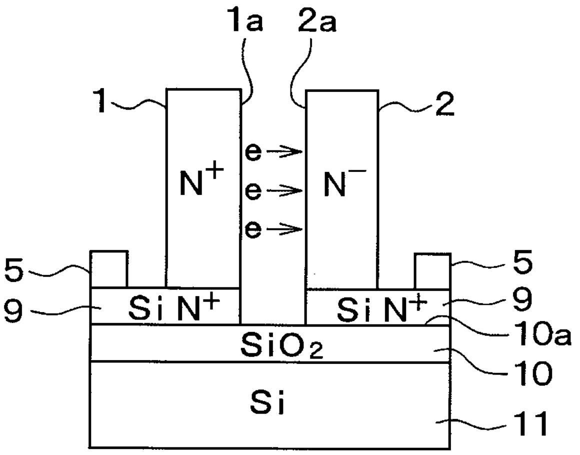
FIG. 5B is a diagram showing a cross sectional view of the generator taken along line VB-VB in FIG. 5A.

FIG. 5A shows a thermionic generator according to a third embodiment, and FIG. 5B shows a cross sectional view of the generator.

As shown in FIGS. 5A and 5B, the thermionic generator includes the emitter electrode 1, the collector electrode 2 and a pair of electrode elements 5. Further, the generator includes a conductive layer 9, a $SiO_2$ layer 10 and a silicon substrate 11.

The $SiO_2$ layer 10 is formed on the silicon substrate 11. The conductive layer 9 is formed on a front surface 10*a* of the $SiO_2$ layer 10. The conductive layer 9 is formed such that a part of the conductive layer 9 corresponds to the emitter electrode 1, and another part of the conductive layer 9 corresponds to the collector electrode 2. The parts of the conductive layer 9 are electrically and physically (i.e., spatially) separated from each other. The conductive layer 9 may be made of silicon.

The emitter electrode 1 and the electrode element 5 for electric connection are formed on the part of the conductive layer 9. The collector electrode 2 and the electrode element 5 for electric connection are formed on the other part of the conductive layer 9.

The above structure is manufactured as follows. The $SiO_2$ layer 10 is formed on the silicon substrate 11. Then, the conductive layer 9 is formed on the front surface 10*a* of the SiO2 layer 10. Similar to the first embodiment, the emitter electrode 1 and the collector electrode 2 are formed on the conductive layer 9. Then, the conductive layer 9 is patterned so that the part of the conductive layer 9 for the emitter electrode 1 and the other part of the conductive layer 9 for the collector electrode 2 are formed. Finally, the electrode elements 5 are formed.

Thus, the electrode elements 5 for electric connection are formed on the part and the other part of the conductive layer 9. The contact resistances of the electrode elements 5 are reduced.

Here, the silicon substrate and the $SiO_2$ layer 10 or the $SiO_2$ layer provide a substrate. The front surface 10*a* of the SiO2 layer 10 provides one surface or a first surface.

(Fourth Embodiment)

Figure 6:
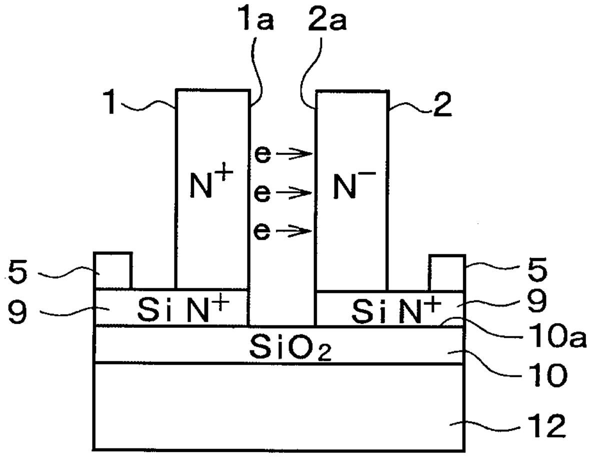
FIG. 6 is a diagram showing a cross sectional view of a thermionic generator according to a fourth embodiment.

FIG. 6 shows a cross sectional view of a thermionic generator according to the present embodiment and corresponds to a cross section taken along line VB-VB in FIG. 5A. As shown in FIG. 6, in the present embodiment, a conductive substrate 12 instead of the silicon substrate 11 is used for the generator. The conductive substrate 12 may be made of metallic material. Thus, the conductive substrate 12 may be used as a substrate of the generator.

Here, the conductive substrate 12 and the $SiO_2$ layer provide a substrate.

(Fifth Embodiment)

In the above embodiments, the emitter electrode 1 faces the collector electrode 2. In the fifth embodiment, the emitter electrode 1 and the collector electrode 2 are stacked, and a pair of the stacked electrodes 1, 2 faces each other.

Figure 7:
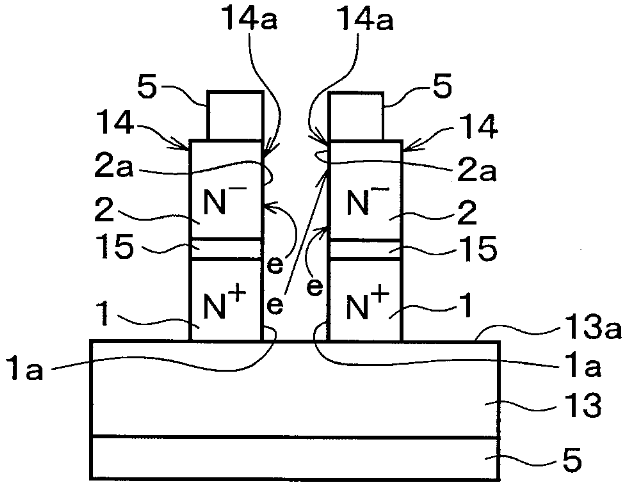
FIG. 7 is a diagram showing a cross sectional view of a thermionic generator according to a fifth embodiment.

FIG. 7 shows a cross sectional view of a thermionic generator according to the present embodiment. As shown in FIG. 7, the generator includes a conductive substrate 13, a pair of stacked electrodes 1, 2 as a pair of stacked structures 14 and the electrode elements 5.

The conductive substrate 13 is made of, for example, highly doped concentration silicon, metallic material such as molybdenum and tungsten, or the like. The conductive substrate 13 has a front surface 13*a*.

The stacked structure 14 includes the emitter electrode 1, the collector electrode 2 and an insulation layer 15. The insulation layer 15 insulates the emitter electrode 1 from the collector electrode 2. The insulation layer 15 is sandwiched between the emitter electrode 1 and the collector electrode 2. The insulation layer 15 is made of $SiO_2$ or P conductive type diamond semiconductor.

The emitter electrode 1 and the collector electrode 2 are stacked so that the thermal electron emitting surface 1*a* and the facing surface 2*a* are disposed on the same plane 14*a*. Thus, the stacked structure 14 is formed. The height of the emitter electrode 1 from the front surface 13*a* of the substrate 13 is 50 micrometers, and the height of the collector electrode 2 from the front surface 13*a* is 100 micrometers. The height, i.e., the thickness of the insulation layer 15 in a direction perpendicular to the front surface 13*a* is a few micrometers.

The plane 14*a* of one stacked structure 14 and the plane 14*a* of the other stacked structure 14 face each other. Further, each plane 14*a* of the stacked structures 14 is perpendicular to the front surface 13*a* of the substrate 13. Thus, each stacked structure 14 is arranged on the same substrate 13.

The electrode element 5 for the collector electrode 2 is formed on the collector electrode 2. The electrode element 5 for the emitter electrode 1 is formed on the substrate 13 opposite to the front surface 13*a*. The plan layout of the generator is similar to that in FIG. 2A, for example.

Thus, the thermionic generator according to the present embodiment is completed. Next, the manufacturing method of the generator will be explained as follows with reference to FIGS. 8A and 8B.

Figure 8A:
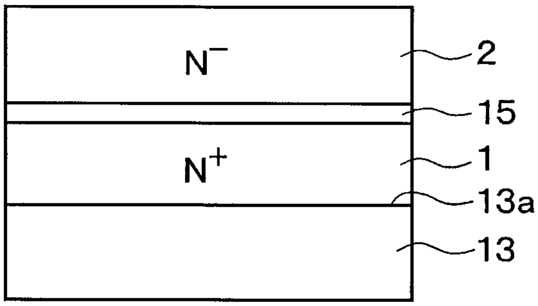
FIGS. 8A and 8B are diagrams showing a manufacturing process of the generator in FIG. 7.

In step in FIG. 8A, the conductive substrate 13 is prepared. The N+ conductive type diamond semiconductor film 6, the insulation layer 15 and the N− conductive type diamond semiconductor film 7 are formed on the front surface 13*a* of the substrate 13.

Figure 8B:
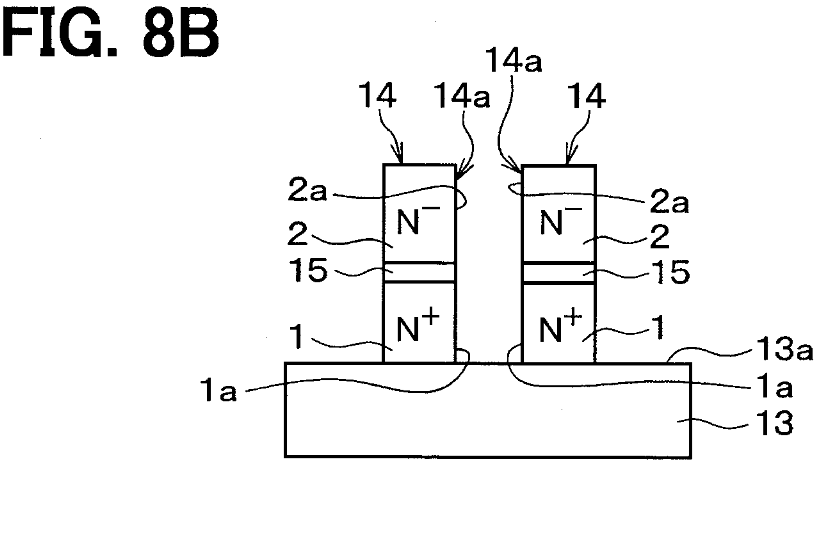

Then, in step in FIG. 8B, a dry etching process (i.e., the trench etching process) is performed, so that the N+ conductive type diamond semiconductor film 6, the insulation layer 15 and the N− conductive type diamond semiconductor film 7 are divided into two stacked structures, which are separated from each other by a predetermined distance. Thus, a pair of stacked structures 14 is formed.

Then, the electrode element 5 for the collector electrode 2 is formed on the collector electrode 2. The electrode element 5 for the emitter electrode 1 is formed on the substrate 13 opposite to the front surface 13*a*. Thus, the thermionic generator in FIG. 7 is completed.

Then, the operation of the generator according to the present embodiment will be explained as follows. The thermal electrons discharged from the emitter electrode 1 are displaced to the collector electrode 2. IN the present embodiment, the emitter electrode 1 and the collector electrode 2 do not face each other. Accordingly, the thermal electrons are displaced from the emitter electrode 1 in one stacked structure 14 to the collector electrode 2 in the same one stacked structure 14. Alternatively, the thermal electrons are displaced from the emitter electrode 1 in one stacked structure 14 to the collector electrode 2 in the other stacked structure 14.

The plane 14*a* of one stacked structure 14 faces the plane 14*a* of the other stacked structure 14. Each plane 14*a* of the stacked structures 14 is arranged perpendicularly to the front surface 13*a* of the substrate 13. Thus, without the spacer, each stacked structure 14 is arranged on the front surface 13*a* of the single substrate 13. Further, a gap is formed between the planes of the pair of stacked structures 14. Accordingly, since there is no spacer, the leak current does not flow through the spacer. Even if the leak current flows, the leak current flows on a part of the plane 14*a* of the insulation layer 15. Accordingly, the leak current between the emitter electrode 1 and the collector electrode 2 is reduced.

Further, the stacked structures 14 stand on the front surface 13*a*. Thus, the area of the plane 14*a* of the stacked structure 14 is wider than the area of the front surface 13*a*. Specifically, although the occupation area of the generator is not increased, the output power of the generator per unit area of the front surface 13*a* is increased. Further, since the height of each electrode 1, 2 is made larger, the output power of the generator is improved.

Further, the stacked structure 14 is easily formed since the N+ conductive type diamond semiconductor film 6, the insulation layer 15 and the N− conductive type diamond semiconductor film 7 are stacked in this order and formed sequentially on the front surface 13*a* of the substrate 13.

Here, the conductive substrate 13 provides a substrate.

(Other Embodiments)

In the fifth embodiment, the emitter electrode 1 is formed on the front surface 13*a* of the substrate 13. Alternatively, the collector electrode 2 may be formed on the substrate 13. Specifically, the stacked structure 14 may be formed such that the collector electrode 2, the insulation layer 15 and the emitter electrode 1 are stacked on the front surface 13*a* of the substrate 13.

The stacked structure 14 has the plan layout of a rectangular shape. Alternatively, as shown in FIG. 4, the stacked structure 14 may have the plan layout of a comb-teeth shape.

Figure 9A:
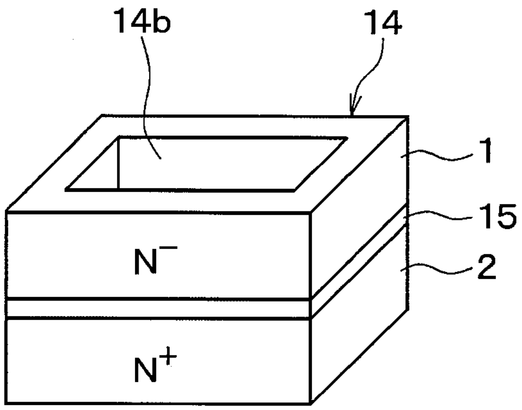
FIGS. 9A and 9B are diagrams showing perspective views of thermionic generators according to other embodiments.

Alternatively, the stacked structure 14 may have a hole 14*b*, as shown in FIG. 9A. In this case, a part of the stacked structure 14 provides one of the pair of stacked structures 14, and the other part of the stacked structure 14 provides the other of the pair of stacked structures 14. Further, a sidewall of the part of the stacked structure 14 provides the plane 14*a* of the one of the pair of stacked structures 14, and a sidewall of the other part of the stacked structure 14 provides the plane 14*a* of the other of the pair of stacked structures 14.

Figure 9B:
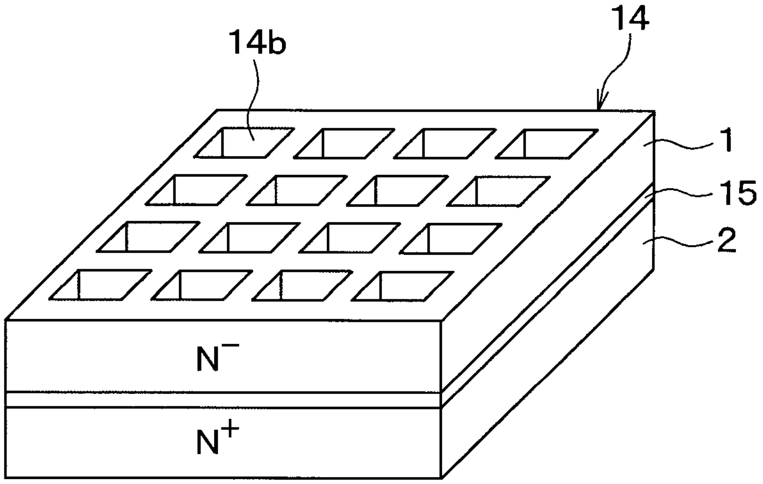

Although the stacked structure 14 in FIG. 9A includes one hole 14*b*. Alternatively, as shown in FIG. 9B, the stacked structure 14 may include multiple holes 14*b*. Alternatively, in the stacked structure 14 in FIGS. 9A and 9B, the collector electrode 2, the insulation layer 15 and the emitter electrode 1 may be stacked in this order on the substrate 13.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A thermionic generator for converting thermal energy to electric energy using thermal electrons displaced between a pair of an emitter electrode and a collector electrode, the thermionic generator comprising:

the emitter electrode for emitting the thermal electrons from a thermal electron emitting surface of the emitter electrode when heat from an external heat source is applied to the emitter electrode;

the collector electrode facing the emitter electrode and spaced apart from the emitter electrode by a predetermined distance, wherein the collector electrode receives the thermal electrons from the emitter electrode via a facing surface of the collector electrode, which faces the thermal electron emitting surface; and a substrate having one surface, wherein the emitter electrode and the collector electrode are disposed on the one surface of the substrate, wherein the emitter electrode is electrically insulated from the collector electrode, wherein the thermal electron emitting surface and the facing surface are perpendicular to the one surface, wherein a distance between the thermal electron emitting surface and the facing surface is smaller than a thickness of the emitter electrode between the thermal electron emitting surface and a surface opposite to the thermal electron emitting surface, and wherein the distance between the thermal electron emitting surface and the facing surface is smaller than a thickness of the collector electrode between the facing surface and a surface opposite to the facing surface.

2. The thermionic generator according to claim 1, wherein the substrate is an insulation substrate, wherein the emitter electrode and the collector electrode contact the insulation substrate, and wherein the emitter electrode and the collector electrode are electrically insulated from each other by the insulation substrate.

3. A thermionic generator for converting thermal energy to electric energy using thermal electrons displaced between a pair of an emitter electrode and a collector electrode, the thermionic generator comprising:

the emitter electrode for emitting the thermal electrons from a thermal electron emitting surface of the emitter electrode when heat from an external heat source is applied to the emitter electrode;

the collector electrode facing the emitter electrode and spaced apart from the emitter electrode by a predetermined distance, wherein the collector electrode receives the thermal electrons from the emitter electrode via a facing surface of the collector electrode, which faces the thermal electron emitting surface; and a substrate having one surface, wherein the emitter electrode and the collector electrode are disposed on the one surface of the substrate, wherein the emitter electrode is electrically insulated from the collector electrode, and wherein the thermal electron emitting surface and the facing surface are perpendicular to the one surface, wherein the emitter electrode and the collector electrode are made of semiconductor material with a semiconductor impurity, which is doped in the semiconductor material, respectively, and wherein a dopant concentration of the semiconductor impurity in the semiconductor material of the emitter electrode is higher than a dopant concentration of the semiconductor impurity in the semiconductor material of the collector electrode.

4. The thermionic generator according to claim 3, wherein the semiconductor material of the emitter electrode and the semiconductor material of the collector electrode are made of diamond.

5. A thermionic generator for converting thermal energy to electric energy with using thermal electrons displaced between a pair of an emitter electrode and a collector electrode, the thermionic generator comprising:

the emitter electrode for emitting the thermal electrons from a thermal electron emitting surface of the emitter electrode when heat from an external heat source is applied to the emitter electrode;

the collector electrode receiving the thermal electrons from the emitter electrode via a facing surface of the collector electrode;

an insulation layer sandwiched between the emitter electrode and the collector electrode;

a substrate having one surface; and a pair of stacked structures, each of which includes the emitter electrode, the insulation layer and the collector electrode stacked on the one surface of the substrate, wherein the thermal electron emitting surface of the emitter electrode and the facing surface of the collector electrode in each stacked structure are disposed on a same plane, wherein the same plane of one stacked structure faces the same plane of the other stacked structure, and wherein the same plane of one stacked structure and the same plane of the other stacked structure are perpendicular to the one surface of the substrate.

6. The thermionic generator according to claim 5, wherein the emitter electrode and the collector electrode are made of semiconductor material with a semiconductor impurity, which is doped in the semiconductor material, respectively, and wherein a dopant concentration of the semiconductor impurity in the semiconductor material of the emitter electrode is higher than a dopant concentration of the semiconductor impurity in the semiconductor material of the collector electrode.

7. The thermionic generator according to claim 6, wherein the semiconductor material of the emitter electrode and the semiconductor material of the collector electrode are made of diamond.

* * * * *